(12) United States Patent
Toldo et al.

(10) Patent No.: US 6,640,349 B2
(45) Date of Patent: Nov. 4, 2003

(54) TOILET SEAT

(75) Inventors: Anthony G. Toldo, Tecumseh (CA); Leo Meyer, Tecumseh (CA); Osman Mourad, Tecumseh (CA)

(73) Assignee: Centoco Plastics Limited, Windsor (CA)

( * ) Notice: Subject to any disclaimer, the term of this patent is extended or adjusted under 35 U.S.C. 154(b) by 0 days.

(21) Appl. No.: 09/921,069

(22) Filed: Aug. 2, 2001

(65) Prior Publication Data

US 2003/0024036 A1 Feb. 6, 2003

(51) Int. Cl.⁷ .............................................. A47K 13/00
(52) U.S. Cl. .................. 4/237; 4/234; 4/242.1
(58) Field of Search ........................ 4/237, 234, 242.1, 4/248; 264/241, 267, 328.1, 328.8, 255, 279, 279.1, 45.1

(56) References Cited

U.S. PATENT DOCUMENTS

| | | | |
|---|---|---|---|
| 1,784,630 A | * 12/1930 | Johnson | 4/237 |
| 1,784,807 A | * 12/1930 | Booth | 4/237 |
| 1,829,526 A | * 10/1931 | Leslie | 4/237 |
| 2,050,472 A | * 8/1936 | Steadman | 4/248 |
| 2,379,400 A | * 6/1945 | Hoffman | 4/237 |
| 2,539,481 A | * 1/1951 | Rosenheim | 4/237 |
| 3,772,111 A | * 11/1973 | Ginsburg | 156/79 |
| 4,014,966 A | * 3/1977 | Hanning | 264/45.1 |
| 4,048,679 A | 9/1977 | Garnett | |
| 4,155,969 A | * 5/1979 | Hendry | 264/45.1 |
| 4,248,646 A | * 2/1981 | Ginsburg | 156/78 |
| 4,318,213 A | * 3/1982 | Blount | 29/434 |
| 4,438,535 A | * 3/1984 | Paredes | 4/234 |
| 4,497,763 A | * 2/1985 | Monnet | 264/255 |
| 4,571,319 A | * 2/1986 | Baluch et al. | 264/40.1 |
| 5,156,796 A | * 10/1992 | Nakagawa et al. | 264/514 |
| 5,464,585 A | * 11/1995 | Fitzgibbon | 264/108 |
| 5,565,240 A | 10/1996 | Smith | |
| 6,154,892 A | * 12/2000 | Hogue | 4/234 |
| 6,307,180 B1 | * 10/2001 | Arx et al. | 219/217 |
| 6,338,167 B1 | * 1/2002 | Baker et al. | 4/234 |

FOREIGN PATENT DOCUMENTS

| | | | |
|---|---|---|---|
| DE | 32 29 172 | * | 2/1984 |
| DE | 193 30 330 | * | 1/1999 |

* cited by examiner

Primary Examiner—Gregory L. Huson
Assistant Examiner—Amanda Flynn
(74) Attorney, Agent, or Firm—Dykema Gossett PLLC

(57) ABSTRACT

A toilet seat assembly is provided. The toilet seat assembly has a toilet seat ring and a toilet seat cover having cores of cellulosic materials such as wood derivatives or other natural cellulosic materials. The toilet seat ring and cover are encapsulated by a polymeric material bonded thereto, preferably polypropylene plastic. The plastic overlay has integrally formed hinge ears to allow the toilet seat ring to be pivotally connected with the toilet seat bowl.

2 Claims, 3 Drawing Sheets

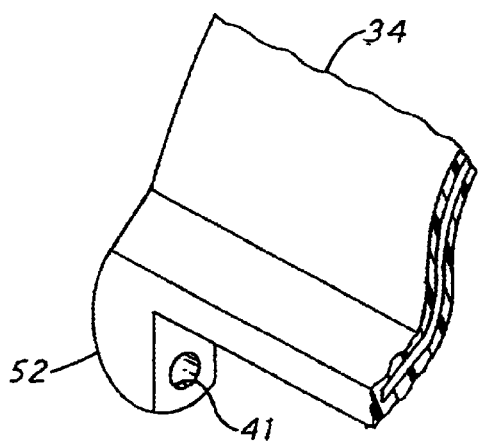
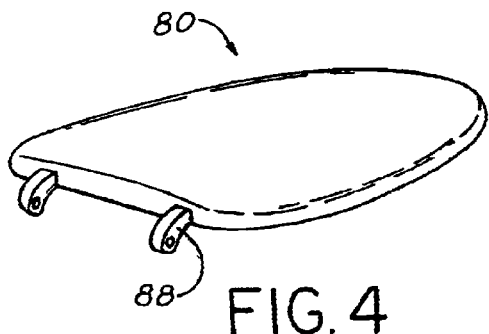
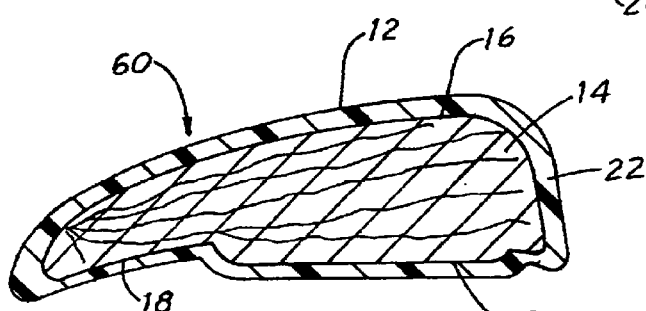
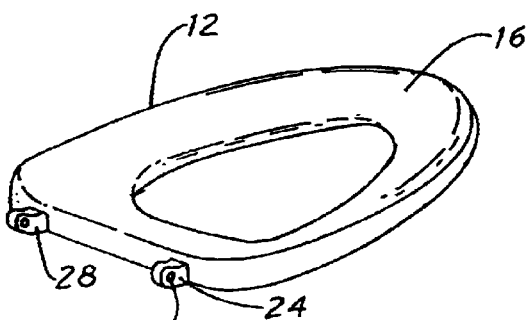
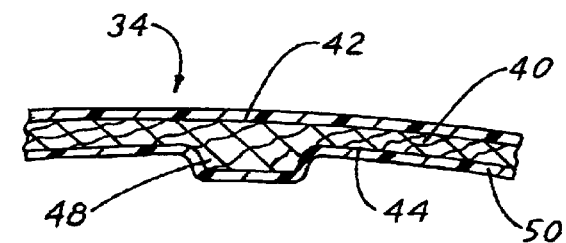
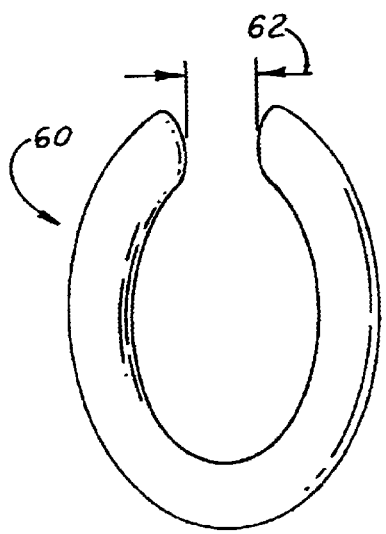

TOILET SEAT

FIELD OF THE INVENTION

The field of the present invention is toilet seat rings and covers and methods of fabrication thereof. More particularly, the present invention relates to toilet seat rings and covers that have cellulosic cores overlaid by a polymeric material bonded thereto.

BACKGROUND OF THE INVENTION

Typically most toilets, sometimes referred to as water closets or commodes, have a ceramic bowl fixture which is affixed to a bathroom floor. On top of the bowl and typically pivotally connected thereto is a toilet seat assembly including a toilet seat ring. When the toilet seat ring is in a lowered position it supports a buttocks region of an occupant above a top rim of the bowl. Pivotally mounted on top of the toilet seat ring is a toilet seat cover. Initially, toilet seat rings and covers were fabricated from cellulosic materials such as wood, compressed wood flour, hemp or other natural organic materials and covered with paint.

The toilet seat is exposed to moisture, bodily fluids, highly caustic or acidic cleaning chemicals and normal wear and tear through usage. To protect the toilet seat from its environmental exposure, and for aesthetic reasons of color, the toilet seat is typically coated with paint. Chipping of the paint can leave the toilet seat unprotected and exposed. The exposed toilet seat becomes more susceptible to the growth of fungi and/or bacteria, which is undesirable. Additionally, exposure tends to cause toilet seats produced from wood, wood flour, hemp or other natural cellulosic byproducts to disintegrate, thereby reducing the useful life of the toilet seat.

As mentioned previously, most toilet seats are pivotally connected to the toilet bowl. Often the toilet seat is pivoted to an upright position to allow for cleaning of the bowl or for enlargement of the target area for urination by a male user of the toilet. It is not uncommon that being pivoted from a generally upright position to a lower position, causes the toilet seat to be acted upon by gravity and be slammed down on the top of the toilet bowl. To prevent damage to the toilet seat and bowl on being pivoted to its lower position and to aid in the support of the toilet seat ring slightly above the upper rim of the toilet bowl, the toilet seat ring is provided with bumpers. The bumpers can be attached to the toilet seat ring by the use of threaded fasteners. However, the use of threaded fasteners tends to be disadvantageous in that the threaded fasteners must be placed in counter-sunk holes to prevent marring of the toilet bowl. Additionally, the bumpers can sometimes become loose and separate from the toilet seat ring after a certain amount of usage. Attempts have been made to attach the bumpers by press fitting, however, typically the press fit bumpers are less secure than bumpers attached with a threaded fastener. Additionally, the threaded fasteners when exposed to moisture can sometimes rust or corrode and generate an unsightly stain which is exposed for viewing when the toilet seat is pivoted to its upright position. The fastener corrosion can also sometimes cause unsightly rust stains to be deposited on the top of the toilet bowl rim.

Hinge ears are also attached to the toilet seat by threaded fasteners to provide for pivotal attachment of the toilet seat to the toilet bowl and for pivotal attachment of the toilet seat cover to the toilet seat ring. The aforementioned disadvantages associated with connection of the bumpers to the toilet seat ring again appear in the connection of the hinge ears to the toilet seat ring. Additionally, chipping of the toilet seat ring paint adjacent the connection of the hinge ears can cause the toilet seat ring to be exposed to moisture and disintegrate the connection.

In an attempt to overcome some of the disadvantages associated with cellulosic toilet seat rings and toilet seat covers, toilet seat rings and covers of polymeric materials have been brought forth. Most polymeric toilet seat assemblies are not nearly as susceptible to damage from exposure to moisture and chemicals as are cellulosic toilet seats assemblies. Polymeric toilet seats can be tinted to a desired color. Accordingly, painting of polymeric toilet seats can be eliminated. Polymeric toilet seats are less dense than toilet seats made from cellulosic material. There is a customer perception that polymeric toilet seats are lacking in quality as compared with toilet seats made from cellulosic material due to the lightness of polymeric toilet seat rings and covers.

It is desirable to provide a toilet seat ring and/or cover that is fabricated from a natural cellulosic material such as wood, wood flour or hemp, which is less susceptible to damage or degradation from exposure to moisture, cleaning chemicals, and the wear and tear associated with normal usage of a toilet seat.

SUMMARY OF THE INVENTION

To make manifest the above noted desire, a revelation of the present invention is brought forth. In a preferred embodiment, the present invention provides a toilet seat assembly which includes a toilet seat ring and seat cover. The toilet seat ring has a core of cellulosic material such as wood, wood flour, hemp or other natural cellulosic material. The cellulosic core by virtue of its material constituent has the density, weight and inherent strength typically associated with high quality toilet seats.

The toilet seat ring has an upper and lower surface. The lower surface, which faces the toilet bowl has incorporated therein integral bumpers. Encapsulating the toilet seat ring cellulosic cover is a bonded polymeric overlay. The polymeric material is preferably, polypropylene plastic. The plastic overlay has integrally formed hinge ears to allow the toilet seat ring to be pivotally connected with respect to the toilet seat bowl. In a similar manner, the toilet seat assembly is provided with a toilet seat cover. The toilet seat cover includes a plate-like core of cellulosic material. The toilet seat cover core is also encapsulated with a plastic overlay covering. The plastic overlay covering of the toilet seat cover incorporates hinge ears to allow the toilet seat to be pivotally connected with respect to the toilet seat ring.

The toilet seat assembly of the present invention provides the strength and quality characteristics of cellulosic material toilet seat assemblies, while at the same time enjoying the durability benefits of prior polymeric material toilet seat assemblies.

Other features and advantages of the present invention will become more apparent to those skilled in the art from the following description of preferred embodiments which refers to the accompanying drawings.

Figure 1:
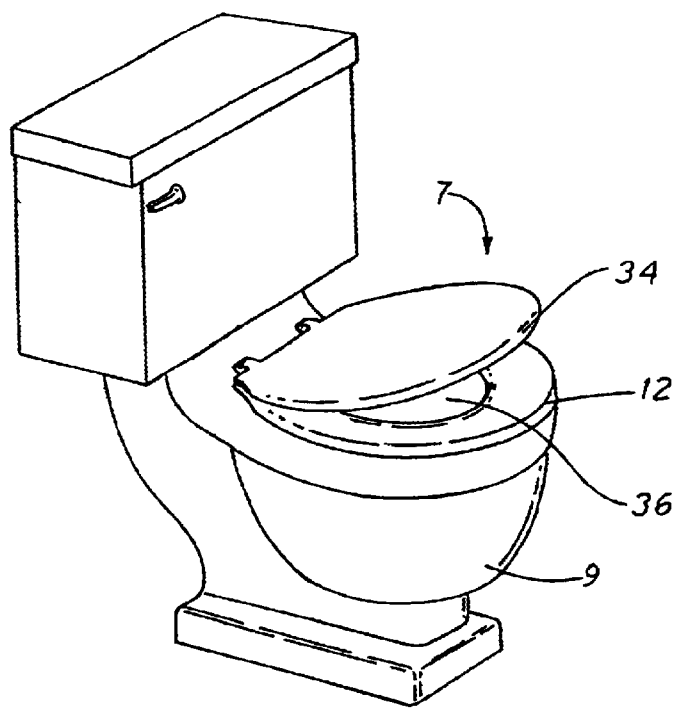
FIG. 1 is a perspective view of a toilet seat bowl having a toilet seat assembly according to a preferred embodiment of the present invention which includes a toilet seat ring and toilet seat assembly.

FIG. 3 is a partial perspective view of the toilet seat cover shown in FIG. 1.

Figure 2:
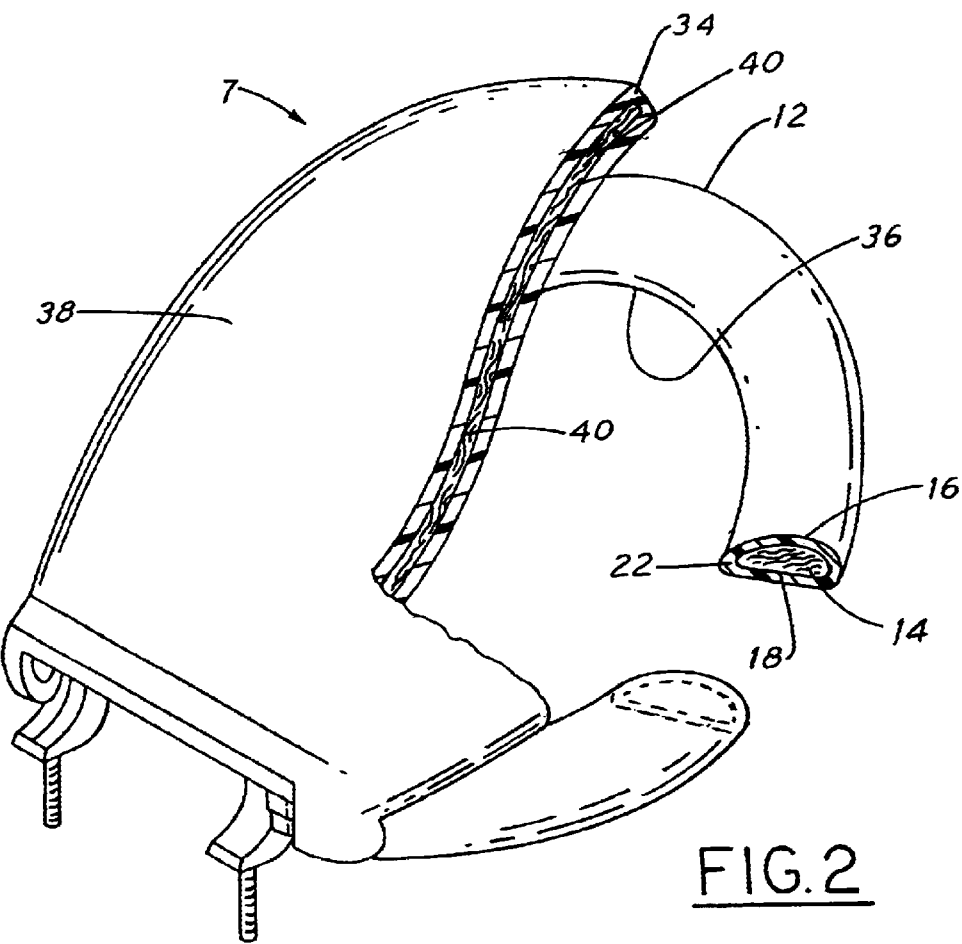
FIG. 2 is a perspective view partially sectioned of the preferred embodiment toilet seat assembly shown in FIG. 1 which exposes the cellulosic cores and polymeric overlays of the toilet seat ring and toilet seat cover.

FIG. 4 is a perspective view of an alternate preferred embodiment toilet seat cover to that shown in FIGS. 2 and 3.

FIG. 5 is a perspective view of the toilet seat ring shown in FIG. 1.

FIG. 6 is a sectional view of the toilet seat ring shown in FIG. 2.

FIG. 7 is a partial sectional view of the toilet seat cover shown in FIG. 2.

FIG. 8 is a top elevational view of an open ring toilet seat for an oval toilet seat bowl.

Figure 9:
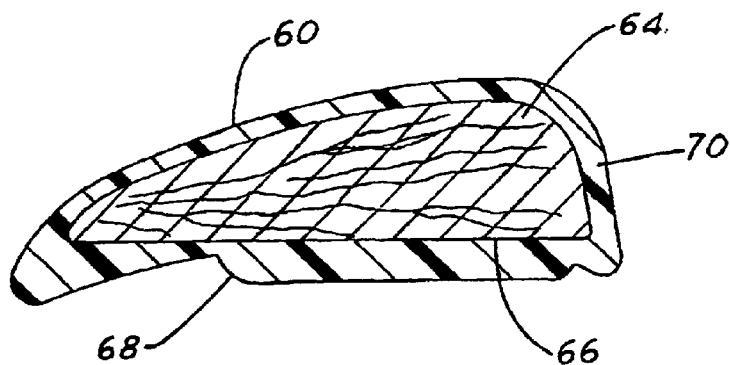

FIG. 9 is a view similar to that of FIG. 6, of an alternate preferred embodiment toilet seat ring.

Figure 10:
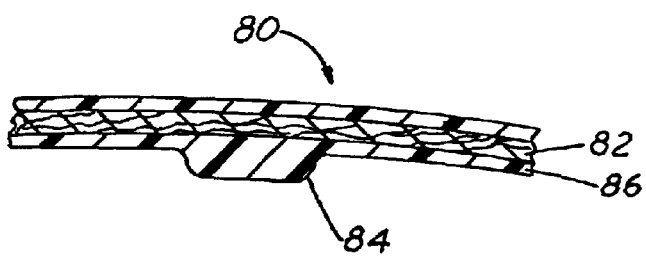

FIG. 10 is a view similar to that of FIG. 7 of an alternate preferred embodiment toilet seat cover.

Figure 11:
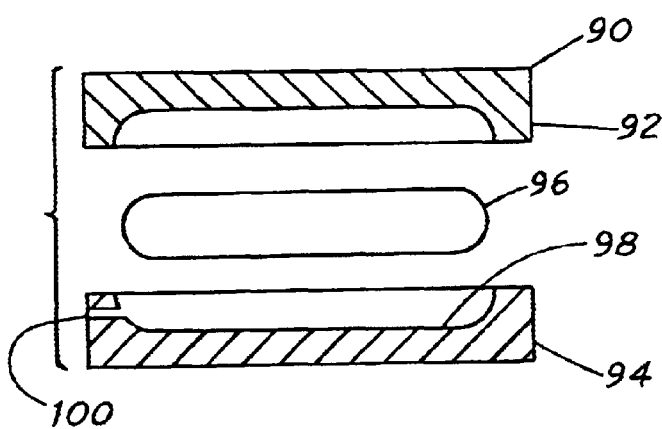
Figure 12:
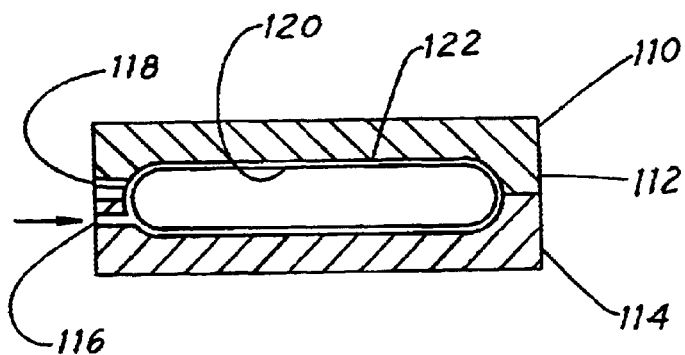
Figure 9:
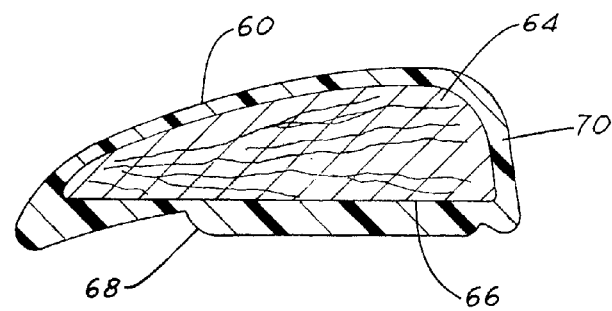
Figure 10:
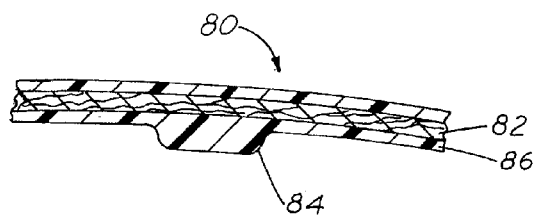
Figure 11:
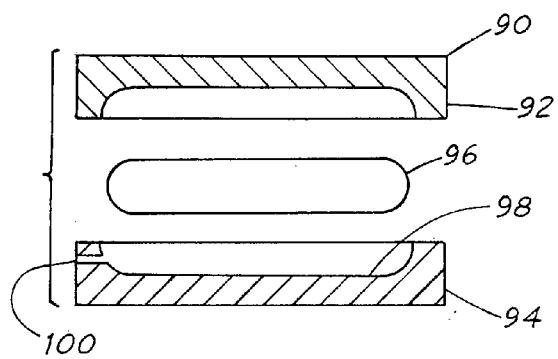
Figure 12:
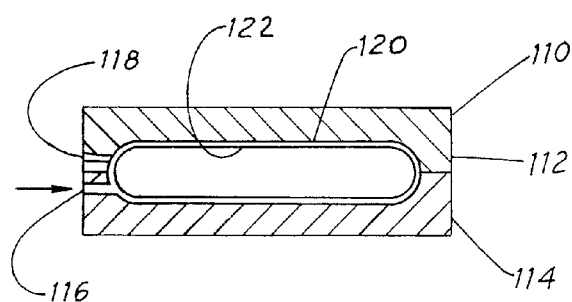

FIGS. 11 and 12 are schematic views of molds utilized in manufacturing toilet seat assemblies according to the present invention.

DETAILED DESCRIPTION OF THE INVENTION

Referring to FIGS. 1 and 2, a toilet seat assembly 7 according to the present invention has a toilet seat ring 12. The toilet seat ring 12 is a closed ring. The toilet seat ring 12 is an elongated member, which is generally round in shape to fit over a like opening in a toilet bowl 9. However, the toilet seat ring of the present invention can also be utilized on toilet seat bowls that have an oval opening. The toilet seat ring 12 can also be designed to be an elevated height toilet seat ring, which is often used by people who have difficulties in bending.

The toilet seat ring 12 has an elongated inner core 14. The inner core 14 may be provided by wood, a wood derivative such as wood flour composite, compressed fiber laminate, or other cellulosic materials such as hemp. The toilet seat ring 12 has an upper surface 16. The upper surface 16 generally faces toward a user of the toilet when the seat ring is pivotally placed in its lowered position. Since the toilet seat ring 12 supports the buttocks region of a toilet user, it is typically contoured to be smooth and free of any abrupt linear edges. The toilet seat ring 12 also has a lower surface 18. The lower surface 18 faces toward the toilet bowl. The lower surface 18 also has, usually in two or four locations, an integrally formed protrusion or bumper 20 (FIG. 6). The bumper 20 allows the toilet seat ring 12 to be supported above a top rim of the toilet seat bowl and additionally protects the toilet seat ring 12 from impact against the toilet seat bowl.

The toilet seat ring 12 has a polymeric overlay 22. The polymeric overlay 22 is typically polypropylene or other suitable alternative material. The overlay 22 covers the inner core upper surface 16 and lower surface 18 and as shown in FIG. 6 totally encapsulates the entire inner core 14. The overlay 22 thickness can vary from less than 0.5 mm. with an upper range governed by the desire of the designer and or the customer. Typically the overlay 22 will not require painting.

Referring additionally to FIG. 5, the overlay 22 also integrally forms hinge ears 24, 28 to allow the seat ring to be pivotally connected with the toilet bowl via a pin (not shown) which extends through a pre-molded or drilled aperture 26 which extends through the hinge ears 24, 28. The overlay 22 will typically bond to the inner core 14. The ears 24, 28 also allow the seat ring 12 to pivotally connect with respect to a toilet seat cover.

Referring also to FIGS. 3 and 7, the toilet seat assembly 7 also has a toilet seat cover 34. The toilet seat cover 34 conceals an opening 36 in the toilet seat ring 12 when the toilet bowl 9 is not being utilized. Additionally, the toilet seat cover 34 has an upper surface 38 which can serve as a seating platform when the toilet is not in use. The toilet seat cover 34 has an inner plate-like cellulosic core 40. The core 40 has an upper surface 42 and a lower surface 44. The lower surface 44 faces toward the toilet bowl 9. The lower surface 44 has an integral bumper 48. The upper and lower surfaces 42, 44 are encapsulated by an overlay covering 50. The overlay covering bonds to the aforementioned upper and lower surfaces. The overlay covering incorporates integral hinge ears 52. The hinge ears 52 have cross bores 41 to accept a pin (not shown) to allow the toilet seat cover 34 to be pivotally connected with respect to the toilet seat ring 12.

Referring to FIGS. 8 and 9, an alternative preferred embodiment toilet seat ring 60 is provided. The toilet seat ring 60 has a circumferential opening 62 along its front end. The toilet seat ring 60 also has a more oval shape to match an oval toilet bowl, not shown. The toilet seat ring 60 has an inner core 64 which is similar to the aforementioned core 14 which is cellulosic. A lower surface 66 of the inner core is generally planar. A bumper 68 of the seat ring is totally fabricated from an overlay layer 70.

Turning to FIGS. 4 and 10, the toilet seat ring 60 can also be associated with a seat cover 80 (FIG. 4). The seat cover 80 has a cellulosic plate-like member core 82. The bumper 84 in a similar manner for that as seat ring 60 is totally fabricated by a polymeric plastic overlay layer 86. The overlay layer 86 also forms hinge ears 88.

FIG. 11 provides a manufacturing mold 90. The mold 90 has an upper half 92 and a lower half 94. If desired the upper half mold 92 can be movable and the lower half can be stationary. The upper half 92 is lifted and a cellulosic core 96 is placed within a depression 98 formed in the mold lower half 94. The upper mold half 92 will be joined to the lower mold half 94. The lower mold half 94 also has an injector passage 100 to allow for injection of the polymeric overlay. As will be apparent to those skilled in the art the mold 90 may have appropriate cooling or heating passages as desired by the molding process.

FIG. 12 shows a mold 110 having an upper mold half 112 and a lower mold half 114. The lower mold half has a polymeric injector passage 116. The upper mold half has a cellulosic injector passage 118. In operation the upper mold half 112 is clamped with the lower mold passage 114. The polymeric overlay is first injected under pressure typically with a gas assist to form upon the outer walls of the mold cavity 120. After an appropriate set or cure time an injection of the cellulosic core material for the toilet seat ring or toilet ring cover is then secondly injected under high pressure to form an inner core 122 for the toilet seat or toilet seat cover. As will be apparent to those skilled in the art the total number of injector passages (sometimes referred to as ports) and locations thereof may be varied to obtain optimum results.

While preferred embodiments of the present invention have been disclosed, it is to be understood that they have been disclosed by way of example only and that various modifications can be made without departing from the spirit and scope of the invention as it is encompassed by the following claims.

We claim:

1. A method of manufacturing a toilet seat ring, comprising:
   first injecting into a mold a polymeric material to encapsulate a core and to integrally form hinge ears to allow said toilet seat ring to be pivotally connected with a toilet bowl; and
   secondly injecting into said mold an injectable cellulosic material to form said core for a toilet seat cover.

2. A method of manufacturing a toilet seat cover, comprising:
   first injecting into a mold a polymeric material to encapsulate a core and to integrally form hinge ears to allow said toilet seat cover to be pivotally connected with respect to a toilet bowl; and
   secondly injecting into said mold an injectable cellulosic material to form said core for said toilet seat cover.

* * * * *

UNITED STATES PATENT AND TRADEMARK OFFICE
CERTIFICATE OF CORRECTION

PATENT NO. : 6,640,349 B2
DATED : November 4, 2003
INVENTOR(S) : Toldo et al.

It is certified that error appears in the above-identified patent and that said Letters Patent is hereby corrected as shown below:

Drawings,
Figure 12, item "120" should be -- 122 -- (see attached)
Figure 12, item "122" should be -- 120 -- (see attached)

Column 4,
Line 51, "passage" should be -- half --
Line 54, "120" should be -- 122 --
Line 56, "122" should be -- 120 --

Column 5,
Line 9, delete "a toilet seat cover" and insert -- said toilet seat ring --

Signed and Sealed this

Twentieth Day of April, 2004

JON W. DUDAS
*Acting Director of the United States Patent and Trademark Office*